(12) United States Patent
Goel

(10) Patent No.: US 10,684,895 B1
(45) Date of Patent: Jun. 16, 2020

(54) SYSTEMS AND METHODS FOR MANAGING CONTAINERIZED APPLICATIONS IN A FLEXIBLE APPLIANCE PLATFORM

(71) Applicant: Veritas Technologies LLC, Mountain View, CA (US)

(72) Inventor: Vikas Goel, Fremont, CA (US)

(73) Assignee: Veritas Technologies LLC, Santa Clara, CA (US)

( * ) Notice: Subject to any disclaimer, the term of this patent is extended or adjusted under 35 U.S.C. 154(b) by 0 days.

(21) Appl. No.: 16/185,306

(22) Filed: Nov. 9, 2018

(51) Int. Cl.
*G06F 3/00* (2006.01)
*G06F 9/54* (2006.01)
*G06F 9/445* (2018.01)

(52) U.S. Cl.
CPC ............ *G06F 9/54* (2013.01); *G06F 9/44505* (2013.01)

(58) Field of Classification Search
CPC .................................. G06F 9/54; G06F 9/541
USPC .......................................................... 719/328
See application file for complete search history.

(56) References Cited

U.S. PATENT DOCUMENTS

| | | | |
|---|---|---|---|
| 2016/0182315 A1* | 6/2016 | Salokanto | H04L 41/5054 709/226 |
| 2017/0147361 A1* | 5/2017 | Kirvan | G06F 9/4416 |
| 2018/0091449 A1* | 3/2018 | Tellez | H04L 5/14 |
| 2018/0365055 A1* | 12/2018 | Bhimani | G06F 9/4881 |
| 2019/0146833 A1* | 5/2019 | Kristiansson | G06F 9/485 |
| 2019/0271578 A1* | 9/2019 | Moeller | G01F 23/296 |

OTHER PUBLICATIONS

Ruben Spruijt, Application Virtualization Smackdown Author(s): Ruben Spruijt, Jurjen van Leeuwen, Rory Monaghan Version: 5.2 (Year: 2016).*

* cited by examiner

*Primary Examiner* — Lechi Truong
(74) *Attorney, Agent, or Firm* — FisherBroyles, LLP

(57) ABSTRACT

The disclosed computer-implemented method for managing containerized applications in a flexible appliance platform may include (1) receiving a request to perform an operation that manages a life cycle of a containerized application, (2) accessing management data for the containerized application, (3) determining, based on the management data, application requirements associated with the requested operation that manages the life cycle of the containerized application, and (4) performing the operation that manages the life cycle of the containerized application based on the application requirements, where the operation is performed without making changes to the containerized application and without user intervention. Various other methods, systems, and computer-readable media are also disclosed.

18 Claims, 6 Drawing Sheets

SYSTEMS AND METHODS FOR MANAGING CONTAINERIZED APPLICATIONS IN A FLEXIBLE APPLIANCE PLATFORM

BACKGROUND

Enterprise software applications are increasingly using technology for performing operating-system-level virtualization (i.e., "containerization") associated with managing various applications providing microservices (e.g., single-function modules with well-defined interfaces and operations) in a networked computing environment. For example, DOCKER container technology may be utilized with applications based on a microservice architecture to run software packages called "containers" created from images specifying their precise contents. Containers may be isolated from each other and bundle their own tools, libraries, and configuration files. In a microservice architecture, container technology may allow applications to automatically perform configuration and management operations when started in a container with appropriate resources such as storage, etc.

Unfortunately, while traditional container technology confers a number of benefits for applications based on a microservice architecture, this same technology presents a number of challenges when applied to enterprise applications based on other service-oriented architectures, such as macro-services. For example, these enterprise applications may often be composed of multiple services and/or roles requiring a high level of user interaction for performing configuration and management operations, thereby negating the automation of operations associated with containerized microservice applications. Thus, utilizing traditional container technology, an enterprise network backup and recovery application would require user input and special handling for configuring various roles based on different storage options, performing version upgrades, and fulfilling quality of service (QoS) requirements (e.g., how and where to allocate application storage for optimum performance).

SUMMARY

As will be described in greater detail below, the instant disclosure describes various systems and methods for managing containerized applications in a flexible appliance platform.

In one embodiment, a method for managing containerized applications in a flexible appliance platform may include (1) receiving, by a computing device, a request to perform an operation that manages a life cycle of a containerized application, (2) accessing, by the computing device, management data for the containerized application, (3) determining, by the computing device and based on the management data, application requirements associated with the requested operation that manages the life cycle of the containerized application, and (4) performing, by the computing device, the operation that manages the life cycle of the containerized application based on the application requirements, where the operation is performed without making changes to the containerized application and without user intervention.

In one example, the containerized application may be out-of-band. For example, an out-of-band containerized application may be associated with a flexible appliance lacking tight coupling or awareness of the application that it can host. In this example, a flexible appliance may be released at a time t0 and applications may be released at time t1, t2, etc., and may further be deployed and hosted on the flexible appliance.

In some embodiments, accessing the management data may include accessing a profile and a toolkit for the containerized application. In some examples, the profile may include (1) an image name of the containerized application, (2) a version of the containerized application, (3) internal requirements associated with managing the life cycle of the containerized application, and (4) external requirements associated with managing the life cycle of the containerized application.

In some examples, the internal requirements may include (1) minimum semaphore data, (2) quality of service parameters, (3) persistent storage data, (4) data storage mounting data, (5) upgrade matrix data, and/or (6) mounting external network file system (NFS) shares on the fly. In some embodiments, the external requirements may include (1) application role data, (2) license key data, (3) authentication data, (4) network data, (5) storage options data, (6) storage size data, (7) authentication tokens, and/or (8) locale data.

In some examples, the toolkit may include a set of application programming interfaces (APIs). In one embodiment, the APIs may be associated with performing various actions associated with the containerized application including (1) initializing the containerized application, (2) starting execution of the containerized application, (3) stopping execution of the containerized application, (4) performing a health check for the containerized application, (5) updating the containerized application for a new resized storage allocation, (6) upgrading the containerized application, (7) checking an upgrade readiness of the containerized application, and/or (8) tuning the containerized application for optimal performance.

In some embodiments, performing the operation associated with managing the life cycle of the containerized application may include creating an instance of the containerized application on the flexible appliance platform. Additionally or alternatively, performing the operation associated with managing the life cycle of the containerized application may include editing an instance of the containerized application. Additionally or alternatively, performing the operation associated with managing the life cycle of the containerized application may include upgrading an instance of the containerized application to a new version. Additionally or alternatively, performing the operation associated with managing the life cycle of the containerized application may include changing a configuration of an instance of the containerized application. Additionally or alternatively, performing the operation associated with managing the life cycle of the containerized application may include monitoring a status of an instance of the containerized application. Additionally or alternatively, performing the operation associated with managing the life cycle of the containerized application may include resizing a containerized application storage.

In one example, a system for managing containerized applications in a flexible appliance platform may include several modules stored in memory, including (1) a receiving module that receives a request to perform an operation that manages a life cycle of a containerized application on a computing device, (2) an access module that accesses management data for the containerized application, (3) a determining module that determines, based on the management data, application requirements associated with the requested operation that manages the life cycle of the containerized application, (4) a management module, that performs the operation that manages the life cycle of the containerized application based on the application requirements, where the operation is performed without making changes to the containerized application and without user intervention, and (5) at least one physical processor configured to execute the receiving module, the access module, the determining module, and the management module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive a request to perform an operation that manages a life cycle of a containerized application on the computing device, (2) access management data for the containerized application, (3) determine, based on the management data, application requirements associated with the requested operation that manages the life cycle of the containerized application, and (4) perform the operation that manages the life cycle of the containerized application based on the application requirements, where the operation is performed without making changes to the containerized application and without user intervention.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
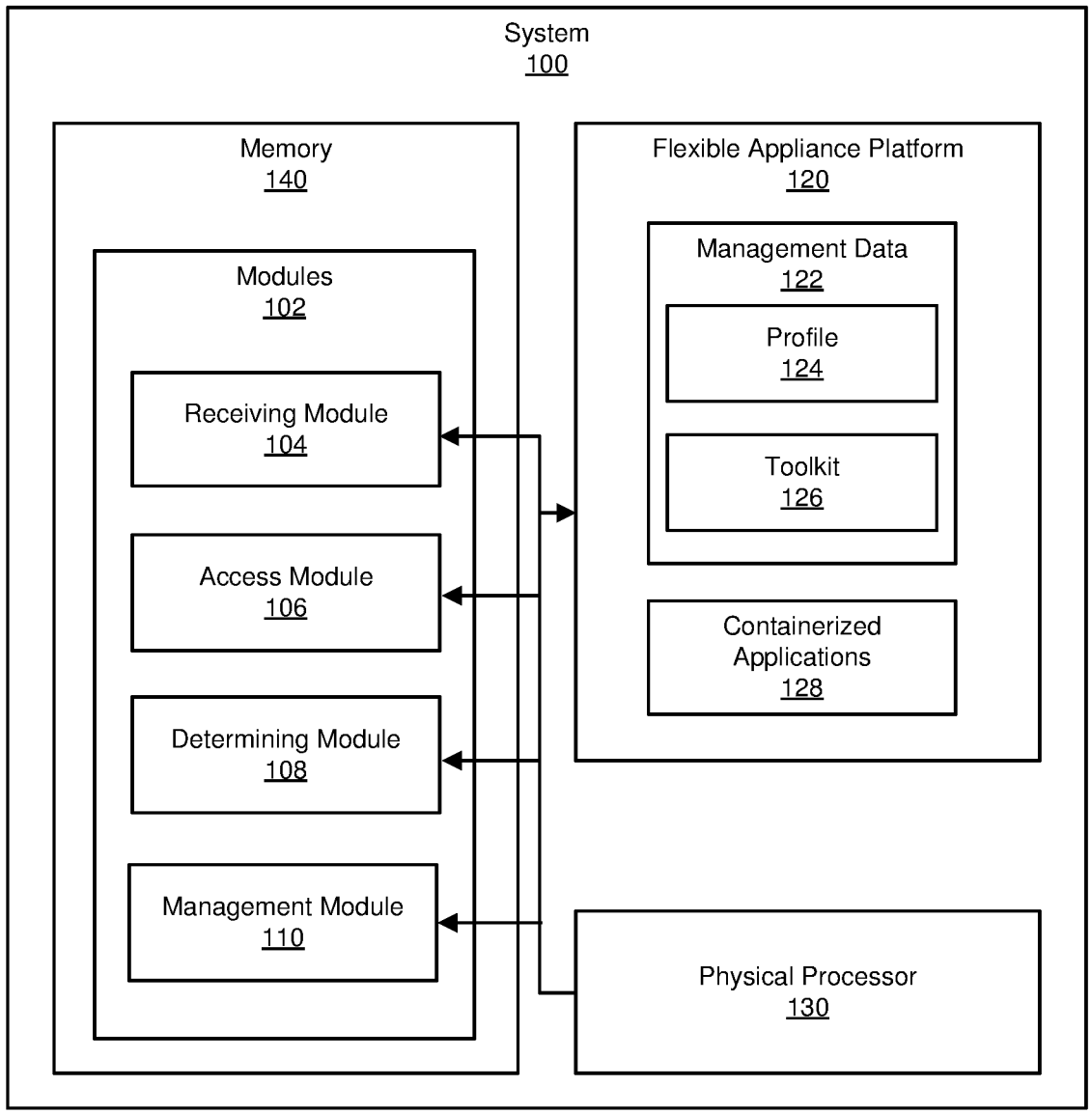
FIG. 1 is a block diagram of an example system for managing containerized applications in a flexible appliance platform.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for managing containerized applications in a flexible appliance platform. As will be explained in greater detail below, by accessing management data on the flexible appliance platform to determine application requirements associated with managing containerized applications, the systems described herein may perform various life cycle operations on the containerized applications without making changes to the containerized applications and without user intervention. In addition, the systems and methods described herein may improve the field of computer container technology by providing automated life cycle management for containerized applications on a flexible appliance platform, thereby reducing the user intervention required by traditional methods.

Figure 2:
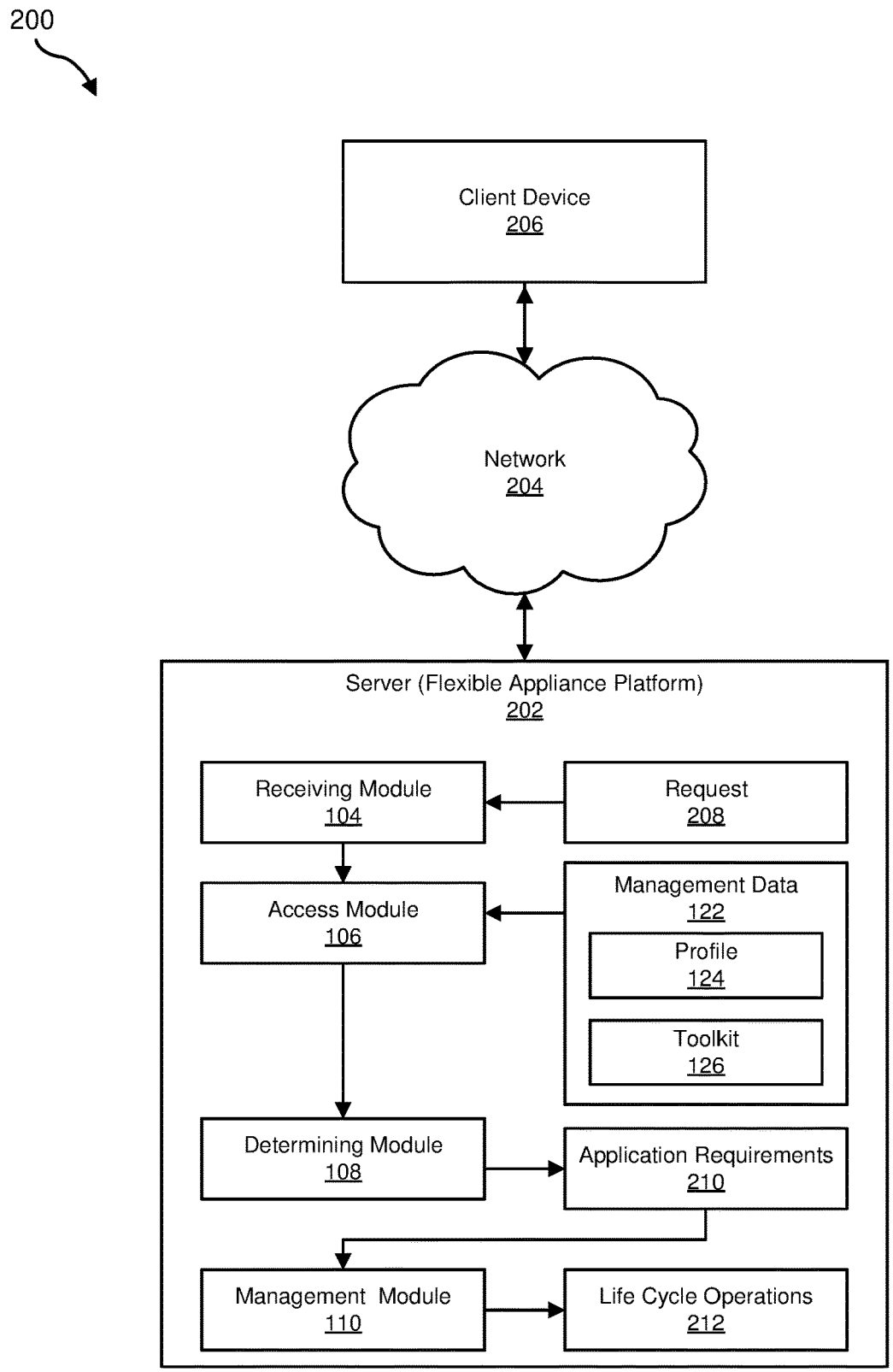
FIG. 2 is a block diagram of an additional example system for managing containerized applications in a flexible appliance platform.

The following will provide, with reference to FIGS. 1-2, detailed descriptions of example systems for managing containerized applications in a flexible appliance platform. Detailed descriptions of corresponding computer-implemented methods will also be provided in connection with FIG. 3. In addition, detailed descriptions of an example profile, toolkit APIs, and life cycle operations for managing containerized applications in a flexible appliance platform will also be provided in connection with FIGS. 4-6.

FIG. 1 is a block diagram of an example system 100 for managing containerized applications in a flexible appliance platform. As illustrated in this figure, example system 100 may include one or more modules 102 for performing one or more tasks. For example, and as will be explained in greater detail below, example system 100 may include a receiving module 104 that that receives a request to perform an operation that manages a life cycle of a containerized application 128. Example system 100 may also include an access module 106 that accesses management data 122 for a received containerized application 128. Example system 100 may additionally include a determining module 108 that determines, based on management data 122, application requirements associated with the requested operation that manages the life cycle of a containerized application 128. Example system 100 may also include a management module 110 that performs the operation that manages the life cycle of a containerized application 128 based on the application requirements. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., server 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate managing containerized applications in a flexible appliance platform. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include a flexible appliance platform 120. In some examples, flexible appliance platform 120 may be utilized to store management data 122 and containerized applications 128. In one example and as described in greater detail below, management data 122 may include a profile 124 and a toolkit 126 associated with one or more application requirements for managing containerized applications 128.

Example system 100 in FIG. 1 may be implemented in a variety of ways. For example, all or a portion of example system 100 may represent portions of example system 200 in FIG. 2. As shown in FIG. 2, system 200 may include a server 202 in communication with a client device 206 via a network 204. In one example, all or a portion of the functionality of modules 102 may be performed by server 202 and/or any other suitable computing system.

As will be described in greater detail below, one or more of modules 102 from FIG. 1 may, when executed by at least one processor of server 202, enable server 202 to manage containerized applications in a flexible appliance platform. For example, receiving module 104 may receive, from client device 206, a request 208 to perform an operation that manages a life cycle of a containerized application 128 on server 202. Next, access module 106 may access management data 122 for a containerized application 128. Then, determining module 108 may determine, based on management data 122, application requirements 210 associated with the requested operation that manages the life cycle of a containerized application 128. Finally, management module 110 may perform the operation that manages the life cycle of a containerized application 128 based on application requirements 210, without making changes to a containerized application 128 and without user intervention Server 202 generally represents any type or form of computing device that is capable of reading and/or executing computer-readable instructions. In some embodiments, server 202 may represent a flexible application platform including one or more servers in a unified environment for providing containerized application services, such as data protection. In one example, a flexible application platform may include multiple server instances including, but not limited to, a master server and multiple media servers. For example, the media servers may include a disk storage pool, a deduplication storage pool, and/or serve as a cloud backup server. Additional examples of server 202 include, without limitation, storage servers, database servers, application servers, and/or web servers configured to run certain software applications and/or provide various storage, database, and/or web services. Although illustrated as a single entity in FIG. 2, server 202 may include and/or represent a plurality of servers that work and/or operate in conjunction with one another.

Client device 206 generally represents any type or form of computing device capable of reading computer-executable instructions. In some examples, client device 206 may represent an endpoint device running client-side backup software. Additional examples of client device 206 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device.

Network 204 generally represents any medium or architecture capable of facilitating communication or data transfer. In one example, network 204 may facilitate communication between server 202 and client device 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
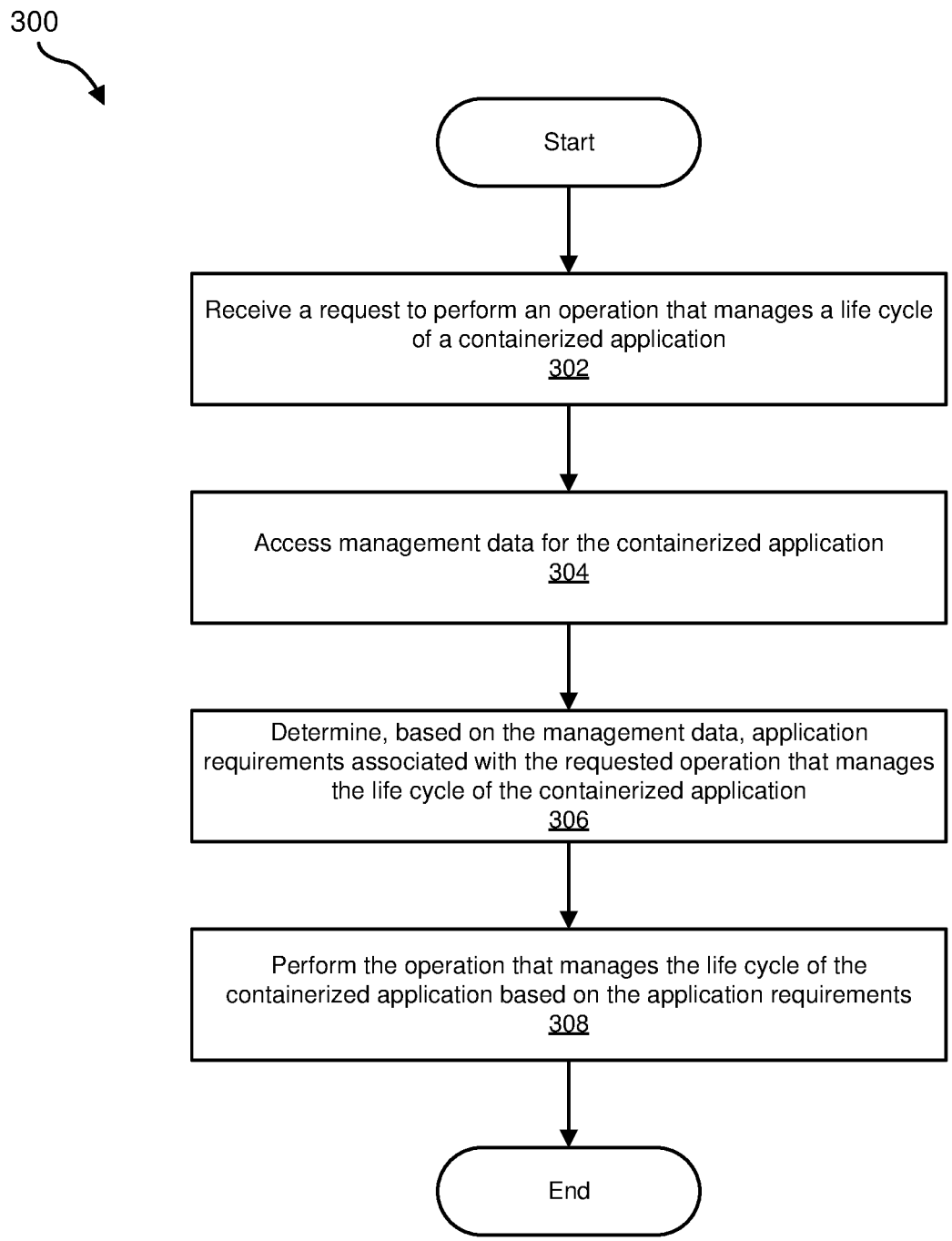
FIG. 3 is a flow diagram of an example method for managing containerized applications in a flexible appliance platform.

FIG. 3 is a flow diagram of an example computer-implemented method 300 for managing containerized applications in a flexible appliance platform. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple substeps, examples of which will be provided in greater detail below.

As illustrated in FIG. 3, at step 302 one or more of the systems described herein may herein may receive a request to perform an operation that manages a life cycle of a containerized application on a computing device. For example, receiving module 104 may, as part of server 202 in FIG. 2, receive a request 208 (from client device 206) to perform an operation that manages a life cycle of a containerized application 128.

The term "containerized application," as used herein, generally refers to any executable software application that has been virtualized by an operating system virtualization program and capable of performing one or more operations on a computing device. In some examples, a containerized application may be configured to serve a specific role in a cloud-based flexible appliance platform and perform various initialization, configuration, monitoring, and/or upgrade operations representing an application "life cycle" (i.e., life cycle operations) based on one or more predetermined requirements. In some embodiments, a containerized application may be configured to serve in a master and/or media server role for performing data protection, data backup and/or data recovery in a computing network. In some examples, the containerized application be out-of-band. For example, an out-of-band containerized application be associated with a flexible appliance lacking tight coupling or awareness of the application that it can host. In this example, a flexible appliance may be released at a time t0 and applications may be released at time t1, t2, etc., and may further be deployed and hosted on the flexible appliance.

Receiving module 104 may receive request 208 in a variety of ways. For example, receiving module 104 may receive, from a user of client device 206, a request to initialize a containerized application 128. Additionally or alternatively, receiving module 104 may receive, from a user of client device 206, a request to change a configuration of a containerized application 128. Additionally or alternatively, receiving module 104 may receive, from a user of client device 206, a request to upgrade an application version associated with a containerized application 128. Additionally or alternatively, receiving module 104 may receive, from a user of client device 206, a request to monitor a health status of a containerized application 128.

At step 304, one or more of the systems described herein may access management data for a containerized application 128. For example, access module 106 may, as part of server 202 in FIG. 2, access management data 122, including profile 124 and toolkit 126, stored on server 202.

Access module 106 may access management data 122 in a variety of ways. In some examples, access module 106 may retrieve profile 124 from management data 122. In some embodiments, profile 124 may be a schema file formatted according to any number of standard file formats (e.g., a JavaScript Object Notation (JSON)) file format and represent an entry point for flexible appliance platform 120. Profile 124 may contain various application details for a containerized application 128 that may be utilized in determining application requirements 210 for performing life cycle operations for a containerized application 128. Access module 106 may additionally retrieve toolkit 126 in management data 122 in a variety of ways. In some examples, access module 106 may retrieve toolkit 126 from management data 122 or from profile 124 in management data 122.

In some embodiments, toolkit 126 may include a set of internal APIs specified for a containerized application 128 and associated roles (e.g., master server or media server roles), that may be utilized in determining application requirements 210 for performing life cycle operations for a containerized application 128. In some examples, profile 124 and toolkit 126 may be developed and delivered by application developers along with an application container image for a containerized application 128.

Figure 4:
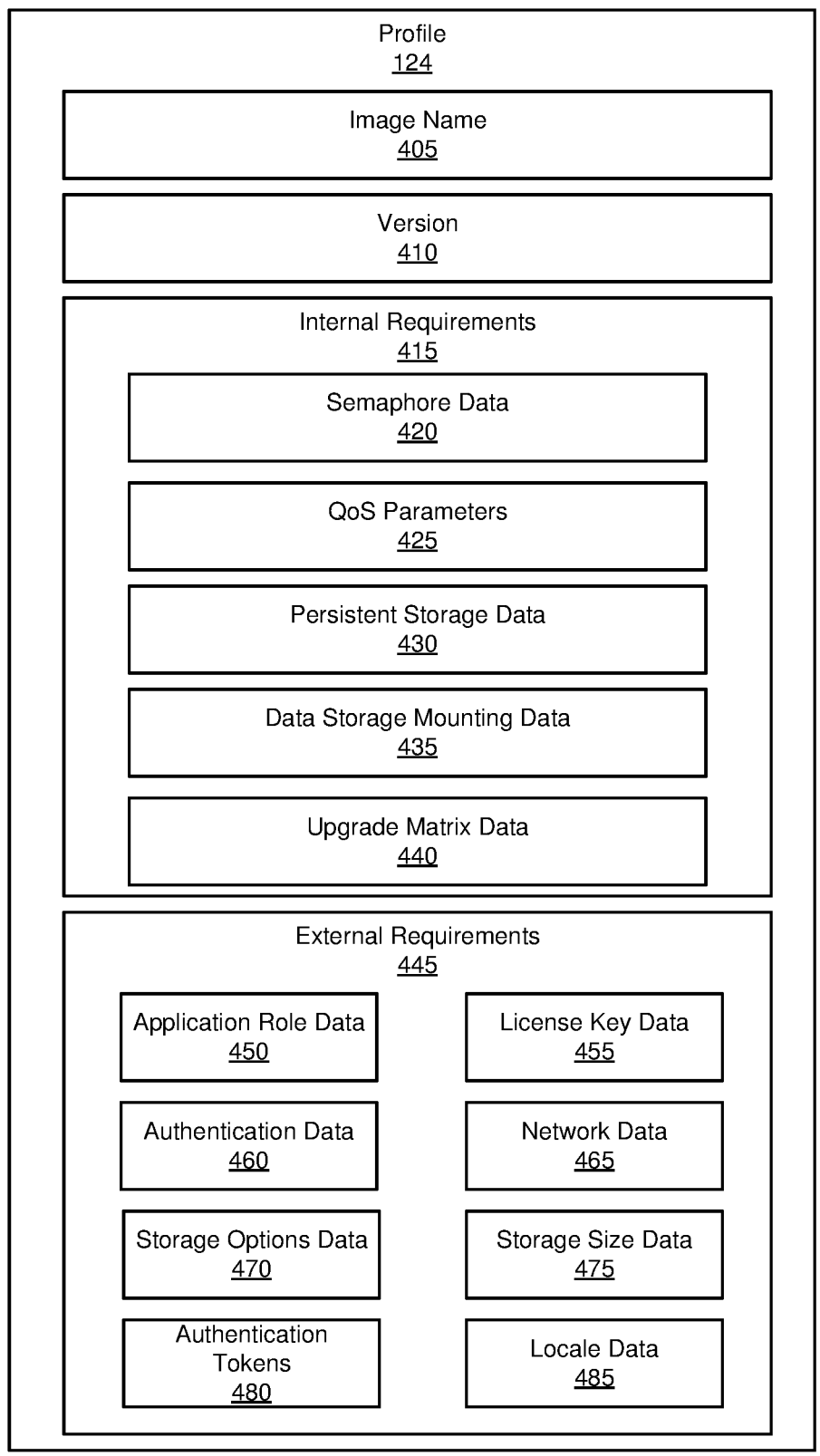
FIG. 4 is a block diagram of a profile utilized for managing containerized applications in a flexible appliance platform.

FIG. 4 is a block diagram of various application details for a containerized application 128 in profile 124. As illustrated in FIG. 4, profile 124 may include an image name 405, a version 410 (e.g., a current version number), internal requirements 415, and external requirements 445. In some examples, internal requirements 415 may include, without limitation, static requirements with respect to a containerized application 128 such as semaphore data 420 (e.g., minimum required semaphore data), persistent storage data 430 (e.g., configuration and log data), data storage mounting data 435 (e.g., data storage mount points), upgrade matrix data 440 (e.g., an upgrade version compatibility matrix), etc. Internal requirements 415 may also include dynamic requirements with respect to available hardware resources where a containerized application 128 may be executed, such as QoS parameters 425.

In some examples, external requirements 445 may include, without limitation, application requirements based on user input needed at the time of instance initialization, configuration changes, and/or instance upgrade operations associated with a containerized application 128, such as application role data 450 (e.g., master server and media server role data), license key data 455, authentication data 460 (e.g., a certificate authority (CA) fingerprint hash), network data 465, storage options data 470, storage size data 475, authentication tokens 480, locale data 485, etc.

Figure 5:
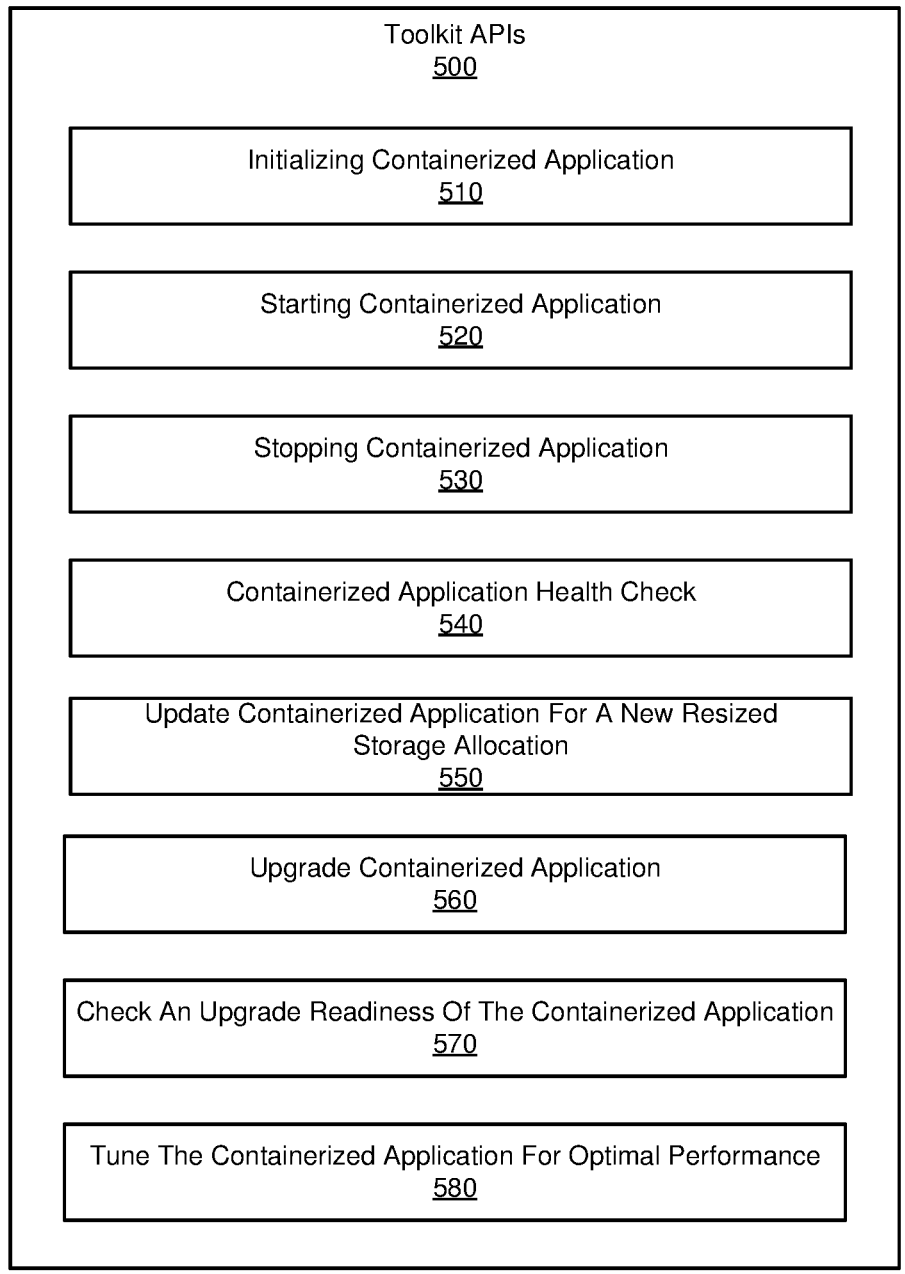
FIG. 5 is a block diagram of toolkit APIs utilized for managing containerized applications in a flexible appliance platform.

FIG. 5 is a block diagram of various toolkit APIs 500 for a containerized application 128 in toolkit 126. As illustrated in FIG. 5, toolkit APIs 500 may include, without limitation, APIs for initializing containerized applications 510, starting containerized applications 520, stopping containerized applications 530, containerized applications health check 540, update containerized application for a new resized storage application 550, upgrade containerized applications 560, check an upgrade readiness of the containerized application 570, and tune the containerized application for optimal performance 580. In some example, toolkit APIs may be bundled within an application container image (e.g., an image of a containerized application 128) or may be delivered as a separate data volume container image (e.g., a DOCKER volume container image). In some examples, flexible appliance platform 120 may be configured to call toolkit APIs 500 inside an application instance along with application requirements 210 obtained from an instance profile (e.g., profile 124) for a containerized application 128.

Returning to FIG. 3, at step 306, one or more of the systems described herein may determine, based on the management data, application requirements associated with the requested operation that manages the life cycle of the containerized application. For example, determining module 108 may, as part of server 202 in FIG. 2, determine, based on management data 122, application requirements 210 associated with the requested operation that manages the life cycle of a containerized application 128.

Determining module 108 may determine application requirements 210 in a variety of ways. In some examples, determining module 108 may identify applications details in profile 124 and toolkit APIs 500 in toolkit 126 corresponding to the life cycle operation requested at step 302. For example, if a requested life cycle operation includes a request to create or edit an application instance, determining module 108 may process profile 124 to obtain relevant requirements (e.g., internal requirements 415 and/or external requirements 445) for this operation which may include storage, networking, and computing requirements. In some examples, the determining module 408 may identify one or more toolkit APIs 500 associated with performing the requested operation such as initializing containerized application 510, update containerized applications for a new resized storage application550, etc.

At step 308, one or more of the systems described herein may perform the operation that manages the life cycle of the containerized application based on the application requirements. For example, management module 110 may, as part of server 202 in FIG. 2, determine, perform a life cycle operation 212 that manages the life cycle of a containerized application 128 based on application requirements 210.

Figure 6:
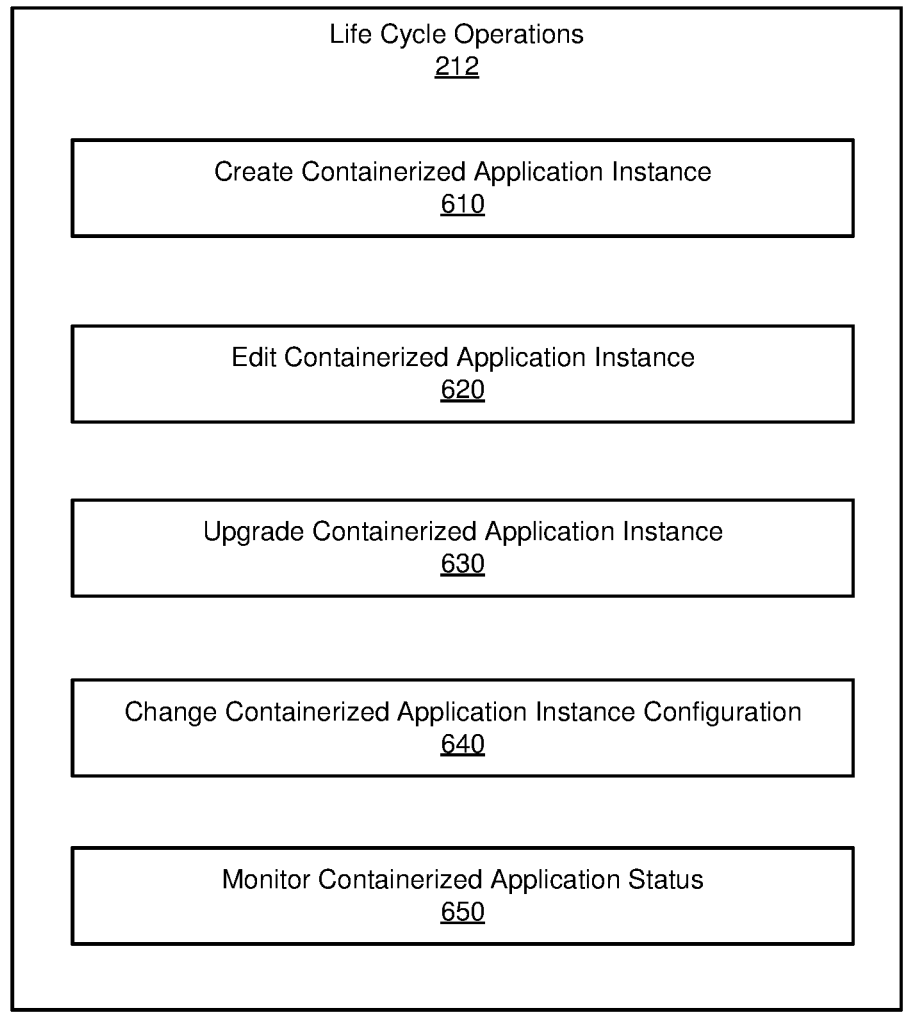
FIG. 6 is a block diagram of life cycle operations for managing containerized applications in a flexible appliance platform.

Management module 110 may perform a life cycle operation 212 in a variety of ways as shown in the block diagram of FIG. 6. In some examples, management module 110 may perform a life cycle operation 212 without making changes to a containerized application 128 and without user intervention. For example, by utilizing application requirements 210 determined from profile 124 and toolkit 126 in management data 122 at step 306, management module 110 does not require user input with respect to application details such as storage, networking, and other provisioning requirements associated with creating, editing, or upgrading (e.g., to a new version) an instance of a containerized application 128.

FIG. 6 is a block diagram of life cycle operations 212 that may be performed by management module 110. As illustrated in FIG. 6, life cycle operations 212 may include, without limitation, create containerized application instance 610, edit containerized application instance 620, upgrade containerized application instance 630, change containerized application instance configuration 640, and monitor containerized application status 650. In some examples, management module 110 may perform one or more of the aforementioned life cycle operations 212 by calling one or more toolkit APIs 500. For example, management module 110 may call initializing containerized applications 510, starting containerized applications 520, stopping containerized applications 530, containerized applications health check 540, and update containerized applications for a new resized storage application 550, upgrade containerized application 560, check an upgrade readiness of the containerized application 570, and/or tune the containerized application for optimal performance 580 toolkit APIs in association with creating and or upgrading an instance of a containerized application 128.

As explained in connection with method 300 above, the systems and methods described provide a flexible appliance platform configured to orchestrate and manage the life cycle of a containerized application. By determining internal and external application requirements (including QoS parameters) for initialization, configuration changes, and upgrades, the systems described herein may be able to containerize multiple applications to initialize application instances, make application configuration changes, monitor application status, and perform application upgrades. Moreover, the systems described herein may enable a flexible appliance to deploy a range of applications (including traditional enterprise and modern applications) in an automated fashion while satisfying the aforementioned requirements without requiring specific knowledge built into the flexible appliance platform. Additionally, the systems described herein may deploy and run any containerized application without any changes in a container image, by writing an independent application profile and an associated toolkit (e.g., an orchestration tool kit) for orchestrating and managing the life cycle of the application.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing containerized applications in a flexible appliance platform, at least a portion of the method being performed by a computing device comprising at least one processor, the method comprising:
   receiving, by the computing device, a request to perform an operation that manages a life cycle of a containerized application, the containerized application comprising an executable software application virtualized by an operating system virtualization program;
   accessing, by the computing device, management data for the containerized application, by accessing a profile comprising internal requirements associated with managing the life cycle of the containerized application, the internal requirements comprising minimum semaphore data, quality of service parameters, persistent storage data, data storage mounting data, and upgrade matrix data;
   determining, by the computing device and based on the management data, application requirements associated with the requested operation that manages the life cycle of the containerized application, wherein determining the application requirements comprises identifying at least one toolkit application programing interface (API) for updating the containerized application for a new resized storage application, wherein the update corresponds to the requested operation; and
   performing, by the computing device, the operation that manages the life cycle of the containerized application based on the application requirements, wherein the operation is performed without making changes to the containerized application and without user intervention.

2. The computer-implemented method of claim 1, wherein accessing the management data further comprises accessing a toolkit for the containerized application.

3. The computer-implemented method of claim 2, wherein the toolkit comprises a set of APIs associated with at least one of:
   initializing the containerized application;
   starting the containerized application;
   stopping the containerized application;
   performing a health check for the containerized application;
   updating the containerized application for the new resized storage application; and
   upgrading the containerized application.

4. The computer-implemented method of claim 1, wherein the profile further comprises at least one of:
   an image name of the containerized application;
   a version of the containerized application; and
   external requirements associated with the managing the life cycle of the containerized application.

5. The computer-implemented method of claim 4, wherein the external requirements comprise:
   application role data;
   license key data;
   authentication data;
   network data;
   storage options data;
   storage size data;
   authentication tokens; and
   locale data.

6. The computer-implemented method of claim 1, wherein performing the operation associated with managing the life cycle of the containerized application comprises creating an instance of the containerized application.

7. The computer-implemented method of claim 1, wherein performing the operation associated with managing the life cycle of the containerized application comprises editing an instance of the containerized application.

8. The computer-implemented method of claim 1, wherein performing the operation associated with managing the life cycle of the containerized application comprises upgrading an instance of the containerized application to a new version.

9. The computer-implemented method of claim 1, wherein performing the operation associated with managing the life cycle of the containerized application comprises changing a configuration of an instance of the containerized application.

10. The computer-implemented method of claim 1, wherein performing the operation associated with managing the life cycle of the containerized application comprises monitoring a status of an instance of the containerized application.

11. The computer-implemented method of claim 1, wherein the containerized application is out-of-band.

12. A system for managing containerized applications in a flexible appliance platform, the system comprising:
- a receiving module, stored in memory, that receives a request to perform an operation that manages a life cycle of a containerized application on a computing device, the containerized application comprising an executable software application virtualized by an operating system virtualization program;
- an access module, stored in memory, that accesses management data for the containerized application, by accessing a profile comprising internal requirements associated with managing the life cycle of the containerized application, the internal requirements comprising minimum semaphore data, quality of service parameters, persistent storage data, data storage mounting data, and upgrade matrix data;
- a determining module, stored in memory, that determines based on the management data, application requirements associated with the requested operation that manages the life cycle of the containerized application, wherein the determining module determines the application requirements by identifying at least one toolkit application programing interface (API) for updating the containerized application for a new resized storage application, wherein the update corresponds to the requested operation;
- a management module, stored in memory, that performs the operation that manages the life cycle of the containerized application based on the application requirements, wherein the operation is performed without making changes to the containerized application and without user intervention; and
- at least one physical processor configured to execute the receiving module, the access module, the determining module, and the management module.

13. The system of claim 12, wherein the access module accesses the management data by further accessing a toolkit for the containerized application.

14. The system of claim 13, wherein the toolkit comprises a set of APIs associated with at least one of:
- initializing the containerized application;
- starting the containerized application;
- stopping the containerized application;
- performing a health check for the containerized application;
- updating the containerized application for the new resized storage application; and
- upgrading the containerized application.

15. The system of claim 12, wherein the profile further comprises at least one of:
- an image name of the containerized application;
- a version of the containerized application; and
- external requirements associated with the managing the life cycle of the containerized application.

16. The system of claim 15, wherein the external requirements comprise at least one of:
- application role data;
- license key data;
- authentication data;
- network data;
- storage options data;
- storage size data;
- authentication tokens; and
- locale data.

17. The system of claim 12, wherein the management module performs the operation associated with managing the life cycle of the containerized application by creating an instance of the containerized application.

18. A non-transitory computer-readable medium comprising one or more computer-executable instructions that, when executed by at least one processor of a computing device, cause the computing device to:
- receive a request to perform an operation that manages a life cycle of a containerized application on the computing device, the containerized application comprising an executable software application virtualized by an operating system virtualization program;
- access management data for the containerized application, by accessing a profile comprising internal requirements associated with managing the life cycle of the containerized application, the internal requirements comprising minimum semaphore data, quality of service parameters, persistent storage data, data storage mounting data, and upgrade matrix data;
- determine, based on the management data, application requirements associated with the requested operation that manages the life cycle of the containerized application, wherein the application requirements are determined by identifying at least one toolkit application programing interface (API) for updating the containerized application for a new resized storage application, wherein the update corresponds to the requested operation; and
- perform the operation that manages the life cycle of the containerized application based on the application requirements, wherein the operation is performed without making changes to the containerized application and without user intervention.

* * * * *